United States Patent [19]
Hwang

[11] Patent Number: 5,930,449
[45] Date of Patent: *Jul. 27, 1999

[54] APPARATUS AND METHOD FOR WRITING RECORD INFORMATION IN VCR

[75] Inventor: Ui Kwon Hwang, Incheon-si, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/498,913

[22] Filed: Jul. 6, 1995

[30] Foreign Application Priority Data

Jul. 6, 1994 [KR] Rep. of Korea ...................... 94-16189

[51] Int. Cl.⁶ .................................................. H04N 7/08
[52] U.S. Cl. ................................ 386/95; 386/46; 386/83; 348/705
[58] Field of Search .................................... 358/335, 342; 348/706, 705, 232, 237, 468; 360/33.1, 69; 386/1, 45–46, 83, 95, 125–126; 455/186.1; H04N 7/08

[56] References Cited

U.S. PATENT DOCUMENTS

| | | | |
|---|---|---|---|
| 4,361,848 | 11/1982 | Poignet | 358/1 |
| 4,908,707 | 3/1990 | Kinghorn | 358/147 |
| 4,908,713 | 3/1990 | Levine | 358/335 |
| 4,977,455 | 12/1990 | Young | 358/142 |
| 5,023,721 | 6/1991 | Moon-Hwan | 358/147 |
| 5,307,172 | 4/1994 | Oh | 358/335 |
| 5,329,500 | 7/1994 | Baik | 368/10 |
| 5,390,027 | 2/1995 | Henmi | 358/335 |
| 5,515,101 | 5/1996 | Yoshida | 348/239 |

*Primary Examiner*—Wendy Garber
*Assistant Examiner*—Vincent F. Boccio
*Attorney, Agent, or Firm*—Fish & Richardson, P.C.

[57] ABSTRACT

An apparatus and method for writing record information in a VCR is disclosed. The apparatus includes a decoder to decode program title data from teletext information via a tuner, a memory to store record information according to an output of the decoder and a key input of a key portion, and a controller for controlling storage and output of record information into the memory. The apparatus further includes a character generator for generating a variety of character signals and for writing record information including program title at the beginning of a program corresponding to the record information output from the memory via the controller.

15 Claims, 2 Drawing Sheets

APPARATUS AND METHOD FOR WRITING RECORD INFORMATION IN VCR

BACKGROUND OF THE INVENTION

The present invention relates to an apparatus and method for writing record information in a video cassette recorder (VCR), and more particularly, to an apparatus and method for writing record information, in which information on a program to see and be recorded is written at the beginning thereof, enabling a user to recognize the information on the recorded program.

Generally, in recording programs using a VCR, information on a program to record, for instance, which channel the program belongs to, when it was recorded, what title it has, and the like, is not recorded. For this reason, during playback, the user cannot figure out information on the program had been recorded.

Korean Utility Model Publication No. 93-6381 filed by the Applicant discloses a case that record information on channel, time and the like is detected and developed to a video signal, and written on a predetermined position of the video signal during recording, enabling the user to see and recognize the record information on channel, time and the like during playback.

However, the disclosure indicates only information on channel and time of a program to record, not a variety of record information.

Meanwhile, as a way to recognize record information on programs recorded, there was proposed the index plus which is one of methods used to search programs recorded on a video tape. According to this method, during recording, a tape ID and program address are loaded in the video blanking interval (VBI) of a video tape, and the tape ID and program title are written in the memory of a VCR. During playback, the program titles recorded on the tape are displayed on the OSD (on-screen display). The cursor highlights the title of a program currently reproduced, indicating which program is being reproduced.

In the index plus function, the title of a program to record can be known. However, information on the tape is stored in the memory of the VCR used for recording, figuring out the title of program, record information, only in the VCR used for recording.

SUMMARY OF THE INVENTION

Therefore, it is an object of the present invention to provide an apparatus and method for writing record information in a VCR, in which channel, start time, record mode and record amount of a recorded program are written at the beginning of recording as well as a program title using teletext information from a broadcasting station, enabling a user to see and figure out record information during playback.

To accomplish the object of the present invention, there is provided an apparatus for writing record information in a VCR, comprising: a decoder for decoding program title data from teletext information via a tuner; a memory for storing record information according to the key input of a key portion and a program title according to said decoded title data; a controller for controlling the storage and output of record information into the memory, the controller controlling the whole system; a character generator for generating a variety of character signals corresponding to the record information including a program title output from the memory via the controller; a first switch for loading the record information on a video signal from the tuner via the character generator according to the control of the controller; and a second switch for outputting the output signal of the character generator to a Y/C processor according to the control of the controller.

For the object of the present invention, there is further provided a method for writing record information in a VCR comprising the steps of: (a) checking whether the current mode is a timer prerecording mode or not, and, if in the timer prerecording mode, storing information embedded in a broadcast signal and key-input record reservation information; (b) outputting the record information stored in the step (a) only for a predetermined time, when recording starts and writing said information on the tape; and (c) finishing the output of the record information when the output time of the record information ends.

BRIEF DESCRIPTION OF THE ATTACHED DRAWINGS

FIG. 1 is a block diagram of one embodiment of a record information writing apparatus for a VCR according to the present invention; and FIG. 2 is a flowchart of explaining a method of writing record information for a VCR of the present invention.

DETAILED DESCRIPTION OF THE INVENTION

Hereinafter, a preferred embodiment of the present invention will be described with reference to the attached drawings.

Figure 1:
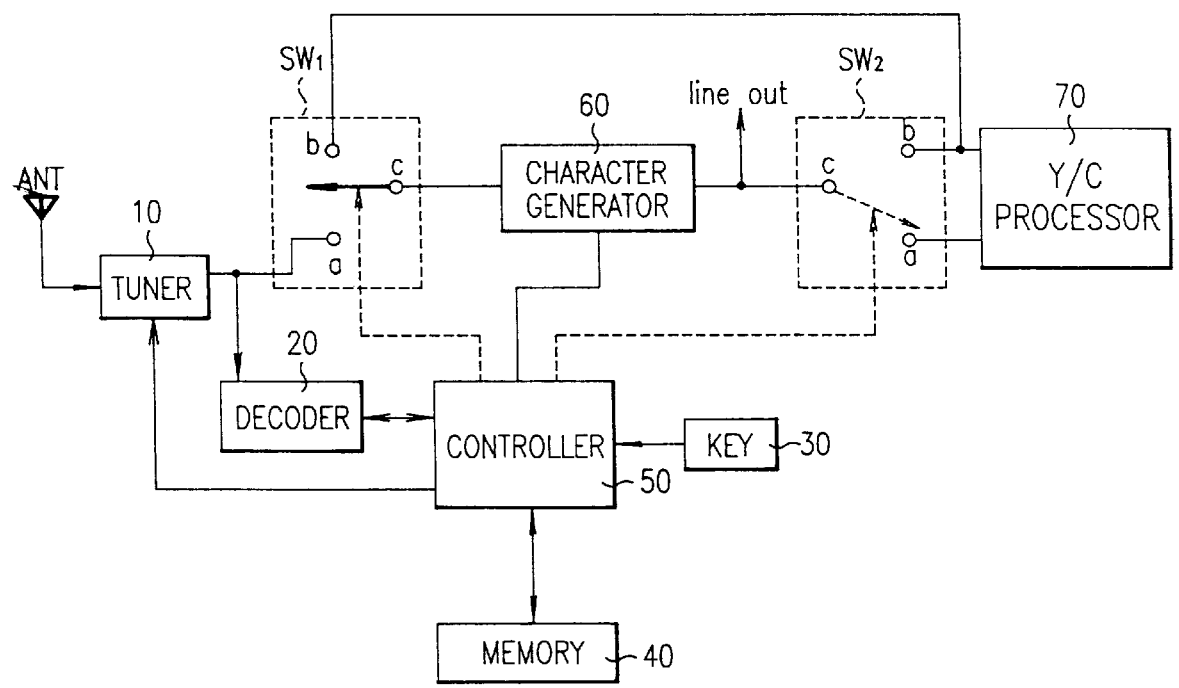

Referring to FIG. 1, one embodiment of a record information writing apparatus of the present invention comprises a decoder 20 for decoding program title data from teletext information via a tuner 10, a memory 40 for storing record information including the program title data decoded in decoder 20 according to the key input of a key portion 30, a controller 50 for controlling the storage of record information into memory 40 and outputting the information from memory 40 with lapse of predetermined time, a character generator 60 for generating a variety of character signals corresponding to the record information output from memory 40 via controller 50 and selectively imposing said signal to the video signal, a first switch SW1 for loading the record information on the video signal from tuner 10 via character generator 60 according to the control signal of controller 50, and a second switch SW2 for outputting the output signal of character generator 60 to a Y/C processor 70 according to the 10 control signal of controller 50. Character generator 60 is made with an OSD.

In the embodiment of the present invention, when a user sets a timer pre-recording mode using key portion 30 in order to perform timer pre-recording for a program, and before the reserved recording time arrives, decoder 20 decodes program title data from the teletext information of the video signal via tuner 10. This decoded data is stored in memory 40 according to the control of controller 50. Here, the teletext information is embedded in the twelfth-twentieth horizontal lines of the video signal, containing a program title, broadcasting schedule, program ID (start time), and the like.

In the recording reservation mode, items of a recording start time, recording speed such as SP (standard play) and LP (long play), channel, and record amount (end time) are displayed on the OSD. The user sets these items to be suitable for a program to record. The record information is stored in memory 40.

When the recording time arrives, controller 50 outputs the record information from memory 40 to character generator 60. Here, controller 50 switches first switch SW1 to ports a and c for record broadcasting program so that the record information from character generator 60 is loaded on the video signal of tuner 10.

The output of character generator 60 is output to ports c and a for the record mode of second switch SW2 according to the controller's 50 control. The output is processed in Y/C processor 70 and written by the head via an amplifier (not shown).

Here, record information including program title from memory 40 is output only for a predetermined time set in controller 50, and thereby recorded only at the beginning of the program to record.

In the on-time recording mode, not the timer pre-recording mode, record information is not written as in the timer pre-recording mode. The current channel and time only are written in the on-time recording mode, which will be explained below.

Above all, when the user sets the recording mode via key portion 30 in order to record the current channel, controller 50 reads out the current time data and current channel data from a time proceeding portion and tuning data storage (not shown), and stores them in memory 40.

The time and current channel data stored in memory 40 are output to character generator 60, and loaded on the video signal of tuner 10. Here, the operation of switches SW1 and SW2 is the same as in the timer pre-recording mode.

The record information from memory 40 is output only for a predetermined time set in controller 50, and thus recorded only at the beginning of the program to record.

Figure 2:
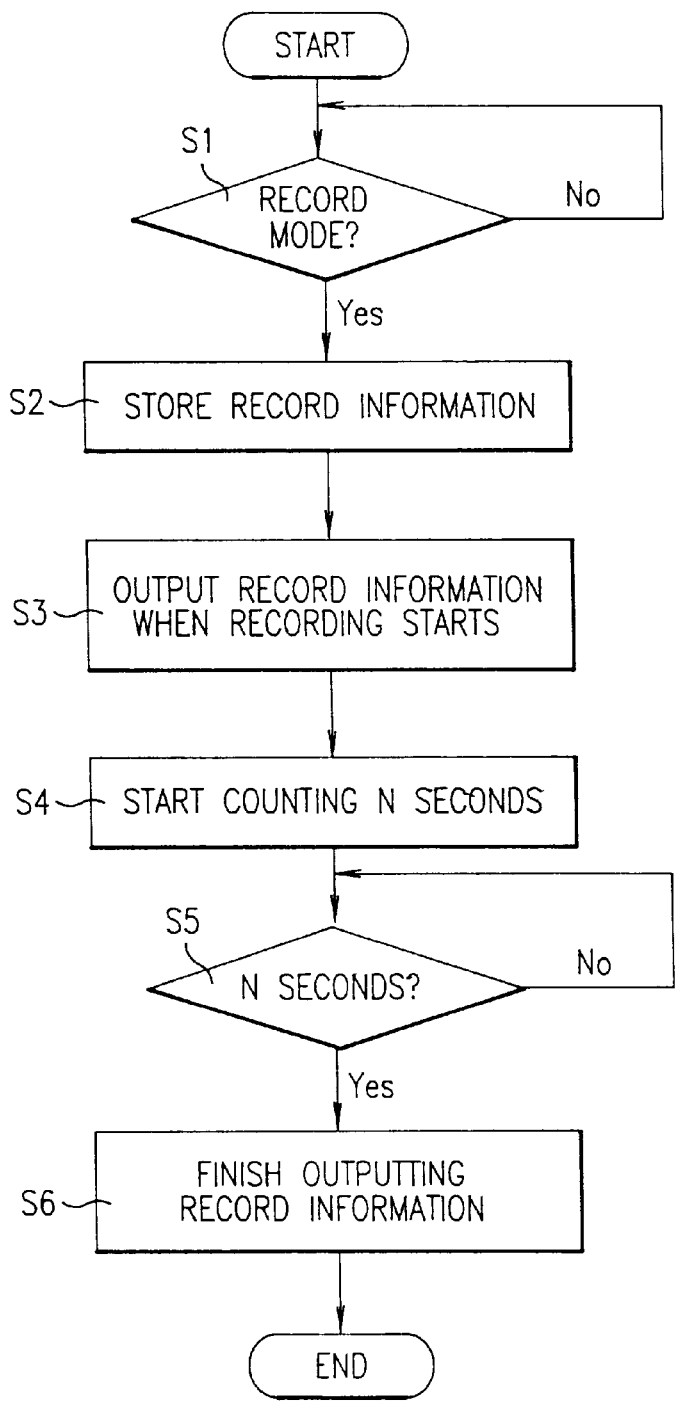

The embodiment of the present invention will be described with reference to the flowchart of FIG. 2.

Controller 50 decides whether the current mode is the recording mode or not in step S1. If in the recording mode, record information is decoded and stored in memory 40 in step S2. Here, in case of the timer pre-recording mode, the record information contains program title, recording start time, recording speed, channel and record amount (ending time). In case of the on-time recording mode, the record information contains channel and time.

When recording begins, the record information stored in memory 40 is output to character generator 60 via controller 50. Here, controller 50 outputs the record information for a internally predetermined time. When the predetermined time ends, the output of the record information of memory 40 is finished through steps S4–S6. Therefore, the record information screen is loaded only at the beginning of the program to record.

As described above, the present invention writes record information on program title, recording mode, recording start time, channel and record amount (ending time) at the beginning of a program to see and record, enabling the user to easily recognize information on the program to record during playback.

What is claimed is:

1. An apparatus for writing record information in a VCR, comprising:
    a tuner configured to receive broadcast signals and to output program video signals and text data signals;
    a decoder connected to receive the text data signals from the tuner and configured to decode the text data signals and output text data;
    a character generator connected to receive the text data from the decoder and configured to generate character video signals;
    video circuitry connected to receive the character video signals and the program video signals, and configured to combine the character video signals with the program video signals to produce a combined character/program video signal;
    a recording unit connected to receive the combined character/program video signal from the video circuitry and configured to record the combined character/program video signal on a recording medium;
    a first switch for loading the text data on a video signal from the tuner via the character generator according to the control of a controller; and
    a second switch for outputting the output signal of the character generator to a Y/C processor according to the control of the controller.

2. The apparatus for writing record information in a VCR as claimed in claim 1, wherein said text data includes recording start time, recording mode, recording finish time and channel in a reserved recording mode.

3. The apparatus for writing record information in a VCR as claimed in claim 1, wherein said text data includes channel and time in an on-time recording mode.

4. The apparatus for writing record information in a VCR as claimed in claim 1, wherein said character generator includes an on-screen display mode.

5. The apparatus of claim 1, further comprising:
    a memory for storing the text data output by the decoder; and
    a controller configured to control storage and output of the text data stored in the memory.

6. The apparatus of claim 5, wherein the controller is configured to automatically initiate storage and output of the text data at a recording time.

7. The apparatus of claim 5, wherein the controller is configured to output the text data only at the begining of a program to be recorded for a pre-determined time that is less than a total length of the program.

8. The apparatus of claim 1, wherein the text data includes program title data.

9. A method for writing record information in a VCR, comprising:
    receiving broadcast signals using a tuner that is configured to output program video signals and text data signals;
    producing program video signals and text data signals from the broadcast signals using a decoder that is connected to receive the text data signals from the tuner;
    decoding the text data signals to produce text data using the decoder;
    generating character video signals from the text data using a character generator that is connected to receive the text data from the decoder;
    combining the character video signals with the program video signals using video circuitry connected to receive the character video signals and the program video signals;
    recording the combined character/program video signal on a recording medium using a recording unit connected to receive the combined character/program video signal from the video circuitry;
    switching a first switch for loading the text data on a video signal from the tuner via the character generator according to the control of a controller; and
    switching a second switch for outputting the output signal of the character generator to a Y/C processor according to the control of the controller.

10. The method of claim 9, wherein said text data includes recording start time, recording mode, recording finish time, and channel in a timer pre-recording mode, and includes channel and time, in an on-time recording mode.

11. The method of claim 9, wherein said text data includes the current channel and time in an on-time recording mode.

12. The method of claim 9, further comprising:

storing the text data in a memory; and controlling storage and output of the text data stored in the memory with a controller.

13. The method of claim 12, wherein controlling the storage and output of the text data is automatically initiated at a recording time.

14. The method of claim 12, wherein the text data is output only at the begining of a program to be recorded for a pre-determined time that is less than a total length of the program.

15. The method of claim 9, wherein the text data includes program title data.

\* \* \* \* \*